No. 701,702. Patented June 3, 1902.
J. F. FOSTER & A. FERBER.
CULINARY SIFTER OR STRAINER.
(Application filed Sept. 23, 1901.)
(No Model.)

Witnesses:
Louis W. Gratz
Emma M. Graham

James F. Foster
Anthony Ferber
Inventors.
By Geyer & Popp
Attorneys.

United States Patent Office.

JAMES F. FOSTER AND ANTHONY FERBER, OF BUFFALO, NEW YORK, ASSIGNORS TO SIDNEY SHEPARD AND COMPANY, OF BUFFALO, NEW YORK.

CULINARY SIFTER OR STRAINER.

SPECIFICATION forming part of Letters Patent No. 701,702, dated June 3, 1902.

Application filed September 23, 1901. Serial No. 76,260. (No model.)

*To all whom it may concern:*

Be it known that we, JAMES F. FOSTER and ANTHONY FERBER, citizens of the United States, residing at Buffalo, in the county of Erie and State of New York, have invented new and useful Improvements in Culinary Sifters or Strainers, of which the following is a specification.

This invention relates to the culinary sifters and strainers which are employed for sifting flour and straining various substances, such as cooked fruits, and which comprise a dish having a reticulated or wire-cloth bottom and a rotary agitator or stirrer for sifting or straining the material through the meshes of the bottom.

The objects of our invention are to simplify the construction of the agitator, its operating-shaft, and the frame or spider in which the shaft is journaled and to so construct these parts that they can be readily removed from the dish to permit nesting of a number of the dishes and be folded into a practically flat condition to permit the removed parts to be packed in a small space for compact shipment and storage.

Figure 1:
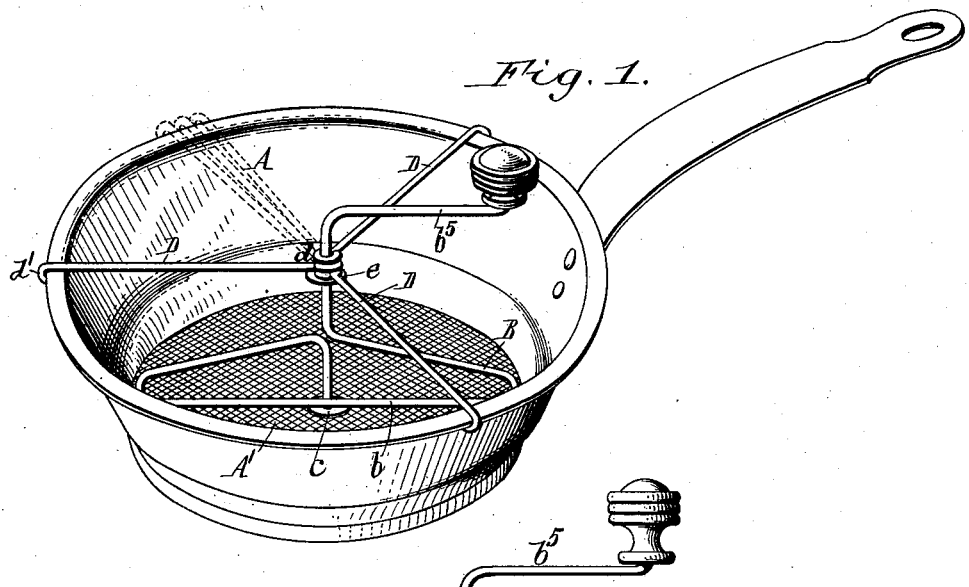
Figure 2:
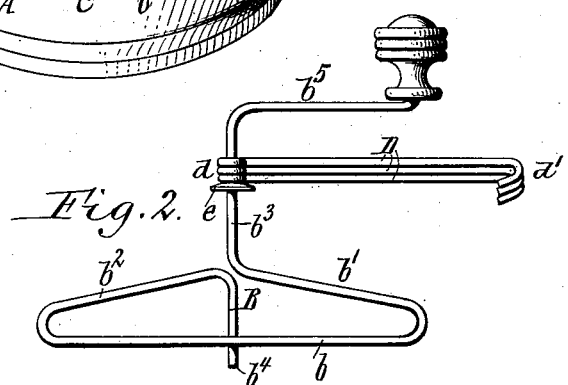
Figure 3:
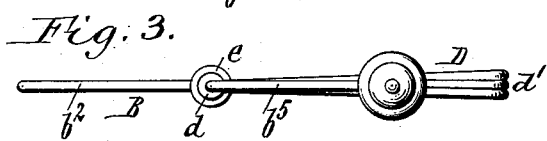
Figure 4:
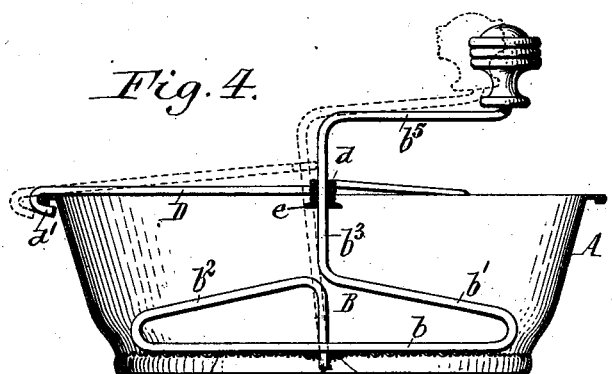

In the accompanying drawings, Figure 1 is a perspective view of a sifter and strainer embodying our invention. Fig. 2 is a detached side elevation of the agitator and the removable frame-arms in which it is journaled, showing the arms folded. Fig. 3 is a top plan view of these parts in the same position. Fig. 4 is a vertical central section of the utensil.

Like letters of reference refer to like parts in the several figures.

A is the usual sheet-metal dish or vessel of the utensil, having a foraminous bottom A', of wire-cloth or other suitable material.

B indicates the rotary agitator, which sweeps over the bottom of the dish and which is mounted on a vertical crank-shaft. The agitator may be of any ordinary or suitable construction, but is preferably made in the form of an upright loop, which latter and the crank-shaft are bent from a single piece of wire. As shown in the drawings, the lower bar $b$ of the agitator-loop rests upon the wire-cloth bottom of the dish and extends diametrically across the same, while the upper bars $b'\, b^2$ of the loop extend inwardly to the center thereof and terminate in oppositely-turned vertical branches $b^3\, b^4$. These branches are located in line with each other and form upper and lower sections of the crank-shaft, the bar $b'$ connecting one end of the continuous agitator-bar $b$ with the lower end of the upper shaft-section $b^3$, while the bar $b^2$ connects the other end of said agitator-bar with the upper end of the lower shaft-section $b^4$. The lower shaft-section $b^4$ is loosely seated in a bearing arranged centrally in the bottom of the dish, while the upper section is provided with a crank $b^5$, having a knob or handle, as shown.

In the construction shown in the drawings the bearing of the lower shaft-section $b^4$ consists of an opening formed in the wire-cloth bottom of the dish and reinforced by a perforated disk or washer $c$, which is soldered to the wire-cloth.

The upper shaft-section $b^3$ is journaled in a frame or spider which is removably attached to the projecting rim of the dish and composed of radial arms, stays, or braces D, three arms being sufficient, as shown. These arms, which are preferably constructed of wire, are provided at their inner ends with eyes or bearings $d$, which loosely encircle the upper section of the crank-shaft, and at their outer ends with hooks $d'$, which engage over the rim of the dish. The inner ends of the arms D are supported on a collar $e$, secured to the upper section of the crank-shaft, and are prevented from becoming detached from the crank-shaft by the knob of the latter.

In order to remove the agitator from the dish, the arms D are all swung or turned to one side of the dish, as shown by dotted lines in Fig. 1, when the crank-shaft can be tilted in the direction of the arms sufficiently to release their hooks from the rim of the dish, as shown in Fig. 4, permitting the shaft to be withdrawn from its bearing in the bottom of the dish. A number of such dishes can thus be nested for compact shipment or storage like ordinary pans or dishes, while the arms D, by reason of their pivotal connection with the crank-shaft, can be folded side by side and brought in the plane of the agitator-loop and the crank $b^5$, as shown in Figs. 2 and 3, permitting a number of the agitators, with the arms D, to be packed in a practically flat condition and compactly shipped or stored. As the arms D are permanently attached to the crank-shaft, they are not liable to be lost or mislaid.

In applying the agitator to the dish the lower end of the crank-shaft is placed in its bearing c, the arms D are brought together and their hooks engaged over the rim of the dish, after which the arms are separated and spaced equally around the dish. In thus spreading the arms the crank-shaft is brought to its vertical position and braced, the arms becoming tightened sufficiently to prevent detachment of their hooks from the dish except by grouping the arms at one side of the dish, as before described. The arms are made of such a length that their hooks snugly embrace the rim of the dish and hold them in their normal position by the frictional contact of the hooks with the dish.

We claim as our invention—

1. In a sifter or strainer, the combination of a dish having a foraminous bottom, an upright shaft removably journaled in the dish and carrying an agitator which sweeps over the bottom of the dish, and a foldable stay-frame for the shaft removably attached to the dish and composed of radial arms having their inner ends connected to the shaft and provided at their outer ends with attachments constructed to engage with the rim of the dish, substantially as set forth.

2. In a sifter or strainer, the combination of a dish having a foraminous bottom, an upright shaft removably journaled in the dish and carrying an agitator, and a removable stay-frame for the shaft composed of foldable arms provided at their inner ends with eyes which loosely encircle the shaft and at their outer ends with hooks which embrace the rim of the dish, substantially as set forth.

3. In a sifter or strainer, an agitator and its operating-shaft bent from a single piece of wire and comprising upper and lower shaft-sections, a continuous agitator-bar extending across the lower shaft-section, a connecting-bar extending from one end of said agitator-bar to the lower end of the upper shaft-section, and a similar connecting-bar extending from the opposite end of said agitator-bar to the upper end of the lower shaft-section, substantially as set forth.

4. In a sifter or strainer, the combination of an upright shaft provided at its upper end with a crank and at its lower end with an agitator arranged in the plane of the said crank, and folding arms or stays pivoted at their inner ends to said shaft and provided at their outer ends with attachments constructed to engage over the rim of the sifter or strainer, substantially as set forth.

Witness our hands this 29th day of August, 1901.

JAMES F. FOSTER.
ANTHONY FERBER.

Witnesses:
CARL F. GEYER,
THEO. L. POPP.